No. 649,014. Patented May 8, 1900.
E. C. TERRY.
STEAM TURBINE.
Application filed July 19, 1899.
(No Model.) 4 Sheets—Sheet 1.

Witnesses
Aw. Stipek
P. J. Egan

Inventor
Edward C. Terry
By James Shepard
Atty.

No. 649,014. Patented May 8, 1900.
E. C. TERRY.
STEAM TURBINE.
(Application filed July 19, 1899.)
(No Model.) 4 Sheets—Sheet 2.
Fig. 4.
Fig. 5.
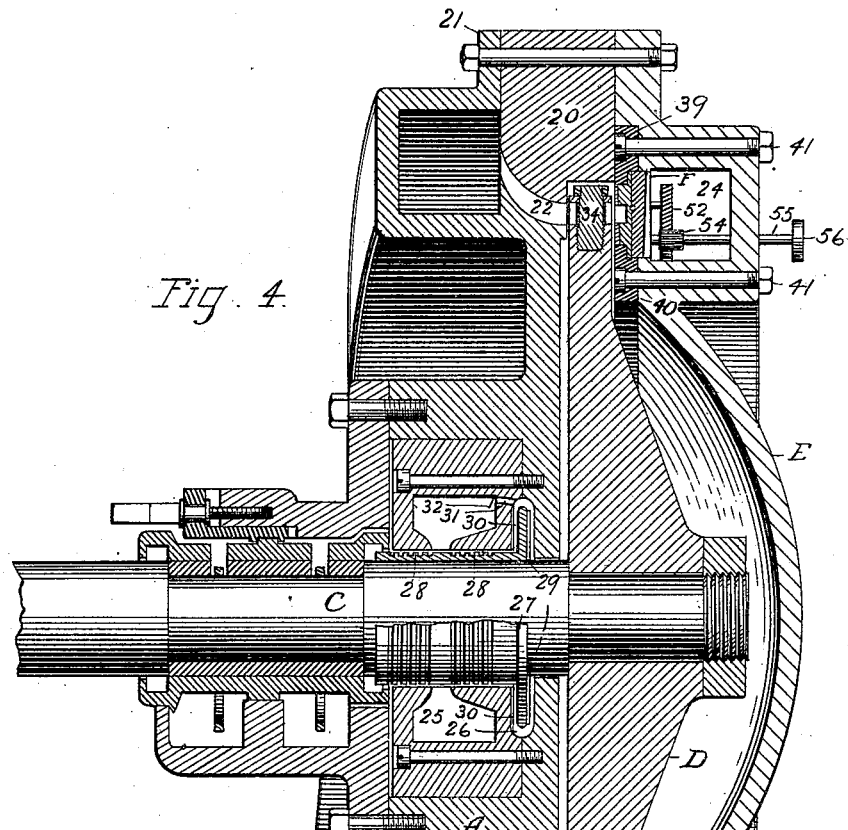
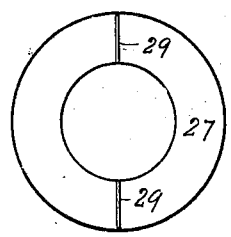
Witnesses
Aw. Stipek
P. J. Egan
Inventor
Edward C. Terry.
By James Shepard.
Atty.

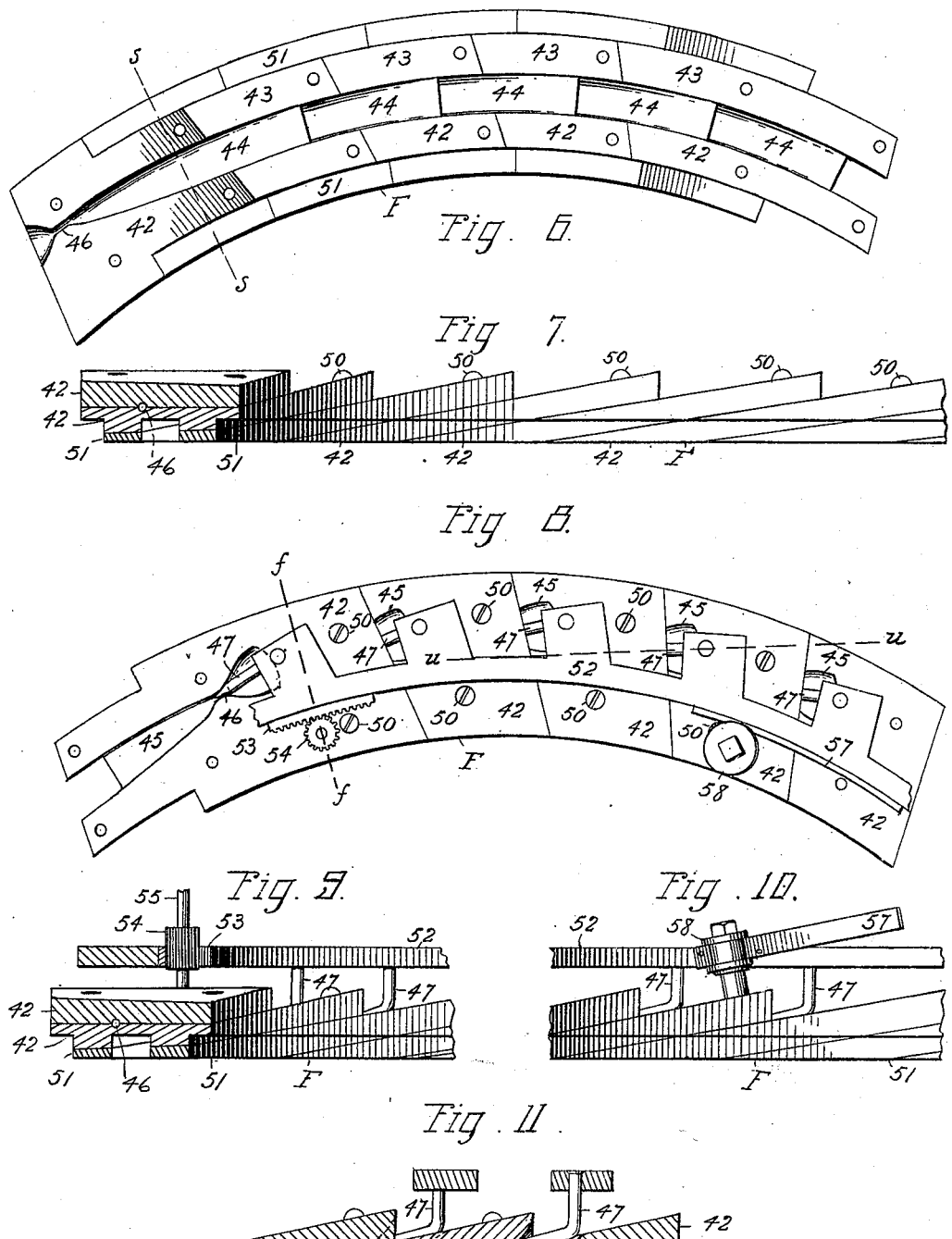

No. 649,014. Patented May 8, 1900.
E. C. TERRY.
STEAM TURBINE.
(Application filed July 19, 1899.)
(No Model.) 4 Sheets—Sheet 4.

Witnesses
A. W. Stipek
P. J. Egan

Inventor
Edward C. Terry
By James Shepard
Atty.

UNITED STATES PATENT OFFICE.

EDWARD C. TERRY, OF HARTFORD, CONNECTICUT.

STEAM-TURBINE.

SPECIFICATION forming part of Letters Patent No. 649,014, dated May 8, 1900.

Application filed July 19, 1899. Serial No. 724,410. (No model.)

*To all whom it may concern:*

Be it known that I, EDWARD C. TERRY, a citizen of the United States, residing in Hartford, in the county of Hartford and State of Connecticut, have invented certain new and useful Improvements in Steam-Turbines, of which the following is a specification.

My invention relates to improvements in steam-turbines; and the main objects of my improvement are simplicity and economy in construction and efficiency in operation.

Figure 1:
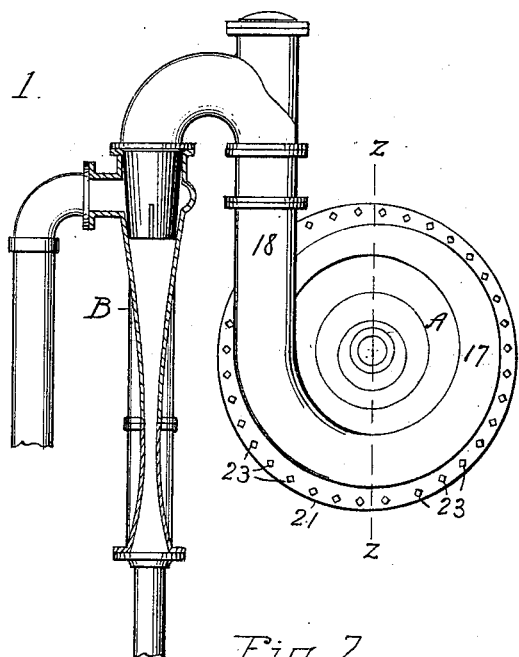
Figure 2:
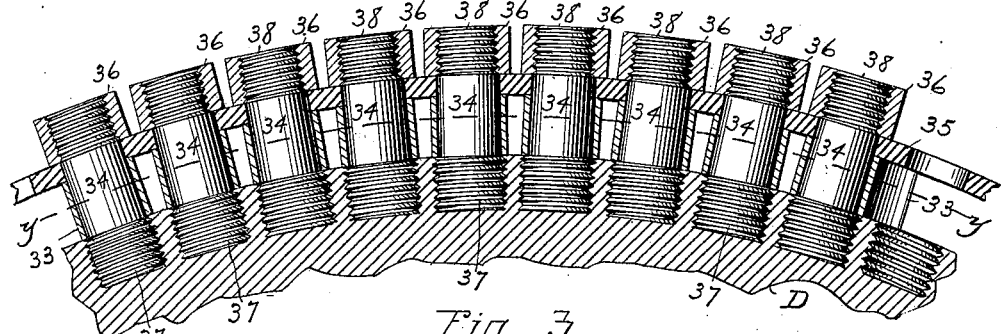
Figure 3:
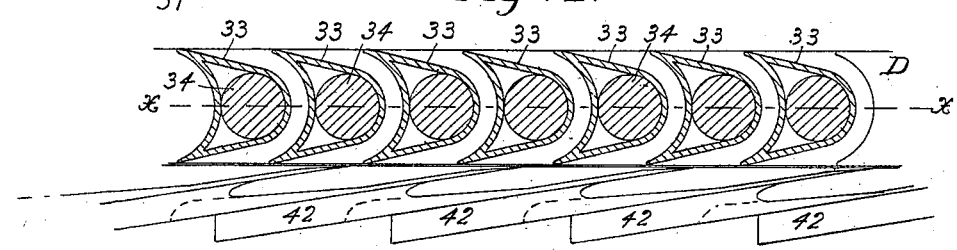
Figure 12:
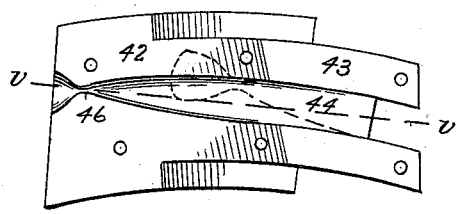
Figure 13:
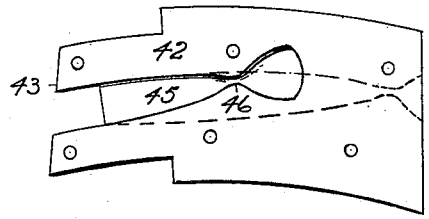
Figure 14:
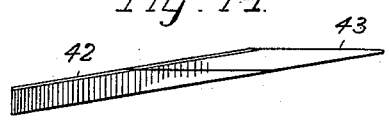
Figure 15:
Figure 16:
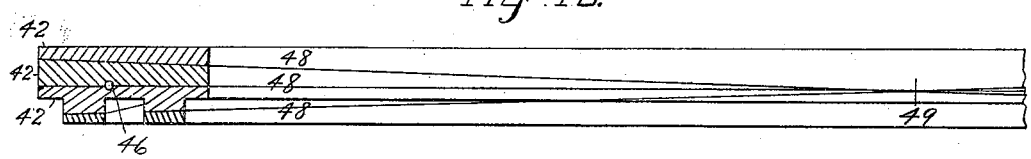

In the accompanying drawings, Figure 1 is a side elevation of my steam-turbine, together with a Bulkley condenser, shown partly in vertical section. Fig. 2 is an enlarged vertical section, partly in elevation, of a portion of the wheel, the plane of section being indicated by the line $x\ x$, Fig. 3. Fig. 3 is a developed sectional view of the wheel and jet-ring, the plane of section being indicated by the line $y\ y$, Fig. 2. Fig. 4 is a vertical section on the line $z\ z$, Fig. 1, partly in elevation, the scale being larger than Fig. 1 and smaller than in Figs. 2 and 3. Fig. 5 is a detached view of the centrifugal packing-disk. Fig. 6 is a side view of a portion of the effluent side of the jet-ring on a scale larger than that of Fig. 4 and smaller than that of Figs. 2 and 3. Fig. 7 is a sectional view of the same on the line $s\ s$, Fig. 6. Fig. 8 is a side view of a portion of the influent side of the jet-ring, together with a portion of the gate-ring. Fig. 9 is a sectional view of the same, partly in elevation, the plane of section being indicated by the line $f\ f$, Fig. 8. Fig. 10 is a detached view showing a portion of the jet-ring and gate-ring. Fig. 11 is a sectional view, partly in elevation, of a portion of the jet and gate rings on the line $u\ u$, Fig. 8. Fig. 12 is a detached view of one of the plates from which the jet-ring is formed, showing the effluent side thereof. Fig. 13 is a similar view showing the opposite side of said plate. Fig. 14 is an edge view of the same, showing the inner edge. Fig. 15 is a sectional view of the same on the line $v\ v$ of Fig. 12; and Fig. 16 is a sectional view of a portion of the jet-ring, with diagrammatic lines, showing the taper of the wedge-shaped plates composing said ring.

A designates the main portion of the case, having upon one side a scroll-shaped collector-pipe 17, that gradually enlarges into the pipe connection 18 and leads to the condenser B, as shown in Fig. 1. The part casing A has a conoidal central hub 19, within which the wheel-shaft C is journaled in any proper manner. The broad side or end of the central hub 19 mainly forms one side of the wheel-chamber. The wheel is composed of the wheel-head D and U-shaped buckets hereinafter described. A case-ring 20 is placed around the conoidal central hub of the main part of the case, with one side resting against the flange 21, the inner edge of the ring being partly conoidal to form the outwardly-curved annular discharge-channel 22, and the remainder of its inner edge is recessed to receive the edge of the wheel. The opposite broad side of the case is formed of the cap E, that is bolted to the ring 20 and part A by means of bolts 23, which cap covers the wheel and contains the annular steam-chamber 24.

In the central part of the case A, surrounding the shaft C, is a water-box 25, which in the main is of an ordinary construction. An annular chamber 26 is formed around the wheel-shaft C, between the part A and the water-box 25. Upon this shaft I place a packing-sleeve 28, with attached centrifugal packing-disk 27, the sleeve being provided with the ordinary reverse screw-threads, while the disk is preferably, but not necessarily, provided with one or more ribs 29. One side of the annular chamber 26 is also provided with a similar rib 30, made rigid on the fixed wall of said chamber. I also form a passage 31, connecting the outer edges of the annular chamber 26 and the chamber in the water-box 25, and place an ordinary clapper-valve 32 in the water-chamber over the said passage 31.

In case the water in the water-box should run along the shaft to the disk 27 the centrifugal action of said disk within the annular chamber will force the water back through the passage 31 into the water-chamber, so as to always keep the chamber full. I have shown a bearing and lubricator for the shaft in Fig. 4; but as the same is of an ordinary construction and does not form the basis for any claim in this case I consider a further reference thereto unnecessary.

I form the wheel of the wheel-head D, U-shaped buckets 33, studs 34, ring 35, and nuts 36. I prefer to make the U-shaped buckets of tubing rolled or swaged into the form in cross-section shown in Fig. 3, whereby the buckets are not only U-shaped, but are in the form of U-shaped shells with walls of substantially the same thickness throughout, or, in other words, the interior form of the hollow buckets or shells is substantially the same as their exterior. The studs 34 are of a peculiar construction. The threaded end 37, that screws into threaded holes in the outer edge of the wheel-head D, is larger than the body of said studs 34. The said reference-numeral may also designate the body of the said studs. The said ends 37 at the bottom of the threads should be fully as large or a little larger than the diameter of the said body. The smaller threaded end 38 in its greatest diameter or top of its thread is no larger than the diameter of said body. I thus form the studs of superior strength in proportion to the size of their body. The inner dimensions of the U-shaped buckets on the line $x\,x$ of Fig. 3 are such as to fit and be filled by the body 34 of the studs, and the curve of the bucket on the inside at its front coincides with the periphery of the body of said studs and fits the same, as shown in Fig. 3, whereby the stud extending through the bucket, as shown in Figs. 2 and 3, into the wheel-head centers the bucket thereon. After screwing the studs into the wheel-head the buckets are placed on said studs, the binding ring or strap 35 placed over the buckets, and the whole secured by nuts 36, as shown.

The jet-ring F or series of jets I form of a series of plates placed so as to lap one on the other, each plate having a portion of a jet on one side and a portion of another jet on the opposite side, the said plates being bound to one side of the steam-chamber 24 by means of the outer and inner holding-rings 39 and 40 and the bolts 41, as shown in Fig. 4. The jet-plates 42 are shown separately in Figs. 12 to 15. The end 43 of each plate that is at the effluent end of the jets is beveled off obliquely at an angle to correspond with the inclined position of the several plates in the jet-ring. The other ends of said plates may be beveled in like manner or cut off square, as may be desired, as the shape of the effluent side of the jet-ring is immaterial. Upon one broad side of each plate there is a portion of a jet or jet-recess 44 and on the other side there is a portion of another jet-recess 45, which is to form a part of the jet next succeeding the jet-recess 44, so that when the plates are placed together, as shown, the jet-ring forms a series of jets extending obliquely through the ring along the dividing-line of the plates and merging together on the effluent side, so as to present a continuous or unbroken annular discharge of steam to the edge of the wheel. The jet portions on the reverse sides of the plates in Figs. 12 and 13 are indicated by broken lines. The jet-recesses are of course shaped to the desired form with the narrow neck 46, that may be opened and closed by the valves or pins 47. The several plates are wedge-shaped or tapering in cross-section, the taper being such that if the planes representing their two sides were continued toward the center of the ring they would meet at said center, as shown by the diagrammatical lines 48, Fig. 16, which meet at a point or line 49, which represents the center of the ring. The several plates are painted and put together and preferably secured by screws 50. The jet-ring can be finished by turning in a lathe after being thus put together. A rabbet 51 or recess is made near each edge of the ring on the discharge or effluent side, as shown, and the holding-rings 39 and 40 are correspondingly rabbeted to fit the rabbeted edges of the jet-ring, as shown in Fig. 4.

I open and close the series of jets 46 by the valves or pins 47, rigidly mounted on the gate-ring 52. This ring is set within the steam-chamber 24 and provided with a rack 53 on a portion of its inner edge, which rack engages a pinion 54 on the shaft 55, that may extend to the outside of the case and be provided with any suitable handle 56, as shown in Fig. 4, whereby the gate-ring may be partially rotated to carry its depending pin-valves 47 to and from the jets. In order to give the pins or valves 47 a spiral movement and present them in proper alinement to the jets, I give the said ring a movement in the longitudinal direction of its axis in addition to its rotary movement around said axis. This I accomplish by means of inclines 57 on the gate-ring and guide-rollers 58, mounted on any suitable support on the jet-ring. Three or four of these inclines and rollers arranged at the inner edge of the gate-ring will give it the proper movement to and from the jet-ring as the gate-ring is rotated to open and close the jets.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. The combination of the shaft C and turbine wheel mounted thereon, with the water-box surrounding said shaft, the annular chamber in the case, also surrounding the said shaft, and the packing-sleeve and centrifugal packing-disk within the said water-box and chamber, substantially as described.

2. The combination of the shaft C and steam-turbine wheel mounted thereon, with the water-box and adjacent annular chamber surrounding the said shaft, and a valved passage connecting the said water-box and annular chamber, substantially as described.

3. In a side-vent turbine, an annular channel into which the wheel discharges bounded by two conoidal walls, one of which meets and coincides with the exterior circumference of the ring of the buckets and the other one with the interior circumference of the said ring, both walls increasing in diameter as they recede from the wheel, substantially as described.

4. In a steam-turbine, the scroll collector-pipe having an annular inlet on one side that receives the discharge from the wheel and with the effluent end of said pipe leading into a condenser, substantially as described.

5. In a steam-turbine, a scroll collector-pipe that receives the discharge from the wheel, with one of its sides communicating with a gradually-enlarging discharge-chamber and its effluent end with a condenser, substantially as described.

6. In a steam-turbine, a scroll collector-pipe having an annular inlet on one side through which the steam is admitted to the said scroll collector-pipe, substantially as described.

7. In a side-vent turbine, an annular channel into which the wheel discharges, the defining-walls of which channel meet and coincide with the interior and exterior circumference of the ring of buckets, the diameter of the said annular channel increasing as it recedes from the wheel, substantially as described.

8. The hollow U-shaped buckets in the form of bucket-shells of substantially the same interior and exterior shape, substantially as described.

9. The combination of the U-shaped bucket-shells, with the wheel-head and a stud fitted to the interior of said shells, and means for holding the said bucket-shells on said studs, substantially as described.

10. The combination in a wheel of the wheel-head and buckets with the bucket-holding studs having the threaded end that enters the wheel-head of a larger diameter than the body of the stud, substantially as described.

11. In a wheel, the hollow U-shaped buckets with U-shaped interior and the holding-studs fitted to said interior as described for centering the buckets on said studs, substantially as described.

12. A series of jets, or jet-ring composed of a series of plates lapped one on the other, each plate containing a portion of a jet on one side and a portion of another jet on the opposite side of said plate, substantially as described.

13. A series of jets or jet-ring, composed of a series of plates lapped one on the other, each plate containing a portion of a jet on one side and a portion of another jet on the opposite side, the said jet portions in the several plates being complementary parts, substantially as described.

14. A series of jets or jet-ring composed of a series of plates lapped one on the other, each plate containing a portion of a jet on one side and a portion of another jet on the opposite side, the said plates being wedge-shaped and converging toward the center of the ring, substantially as described.

15. The combination of two jet-plates placed one upon the other and having a jet formed partly in one plate and partly in the other with the dividing-line between said two plates passing longitudinally through the jet, substantially as described.

16. In a series of plates lapped one upon the other in ring form with recesses in their confronting faces that form jets between said plates, the end portions of said plates on the discharge side being faced off to form a plane surface through which the jets pass obliquely and in a complete ring form substantially a continuous annular jet, substantially as described.

17. The combination of a series of plates which lap one upon the other and form a jet-ring having an annular recess with a holding-ring fitted to said recess and supporting said plates, substantially as described.

18. The combination of an annular series of jets with a gate-ring having pointed pins rigidly attached thereto and means for moving the said ring in the longitudinal direction of its axis and to simultaneously rotate the said ring whereby the pins have a spiral movement, substantially as described.

19. The combination of an annular series of jets, with a rotary gate-ring having pin-valves attached for closing said jets, inclines mounted on the said ring, and roller-guides supporting said inclines and the said ring, substantially as described.

EDWARD C. TERRY.

Witnesses:
  JAMES SHEPARD,
  A. W. STIPEK.